United States Patent [19]
Bruckert

[11] Patent Number: 5,596,333
[45] Date of Patent: Jan. 21, 1997

[54] METHOD AND APPARATUS FOR CONVEYING A COMMUNICATION SIGNAL BETWEEN A COMMUNICATION UNIT AND A BASE SITE

[75] Inventor: Eugene J. Bruckert, Arlington Heights, Ill.

[73] Assignee: Motorola, Inc., Schaumburg, Ill.

[21] Appl. No.: 298,918

[22] Filed: Aug. 31, 1994

[51] Int. Cl.⁶ .................................................... G01S 3/02
[52] U.S. Cl. ................... 342/457; 342/450; 455/54.1; 455/277.1
[58] Field of Search .................................. 342/357, 463, 342/450, 457; 455/54.1, 277.1, 33.1; 340/991, 989

[56] References Cited

U.S. PATENT DOCUMENTS

| | | | |
|---|---|---|---|
| 4,101,836 | 7/1978 | Craig et al. | 325/302 |
| 4,128,740 | 12/1978 | Graziano | 179/2 EB |
| 4,144,496 | 3/1979 | Cunningham et al. | 325/53 |
| 4,317,229 | 2/1982 | Craig et al. | 455/277 |
| 4,845,504 | 7/1989 | Roberts et al. | 342/457 |
| 5,134,715 | 7/1992 | Parl et al. | 455/64 |
| 5,235,633 | 8/1993 | Dennison et al. | 379/60 |
| 5,280,472 | 1/1994 | Gilhousen et al. | |
| 5,365,516 | 11/1994 | Jandrell | |
| 5,383,164 | 1/1995 | Sejnowski et al. | 67/134 |
| 5,392,451 | 2/1995 | Schwendeman et al. | 455/13.1 |
| 5,465,393 | 11/1995 | Frostrom et al. | 455/45.1 |
| 5,475,864 | 12/1995 | Hamabe | 455/33.1 |
| 5,491,833 | 2/1996 | Hamabe | 455/33.1 |

Primary Examiner—Thomas H. Tarcza
Assistant Examiner—Dao L. Phan
Attorney, Agent, or Firm—Daniel C. Crilly; Kevin A. Buford; Jeffrey G. Toler

[57] ABSTRACT

A communication system (100) employs a method (600) and apparatus (101) for conveying a communication signal between a communication unit (105) and a base site (101) that services a sectorized coverage area (103). The communication unit (105) transmits an uplink communication signal (113) to the base site (101). The base site (101) receives (603) the uplink communication signal (113) and determines (605) an approximate location of the communication unit (101) within a first portion (111) of a sector (108) of the sectorized coverage area (103). A downlink communication signal is then transmitted (609, 613) to the communication unit (105) based on the approximate location of the communication unit (105) using an antenna structure that produces a beamwidth (117) narrower than an angular width of the sector (108).

32 Claims, 6 Drawing Sheets

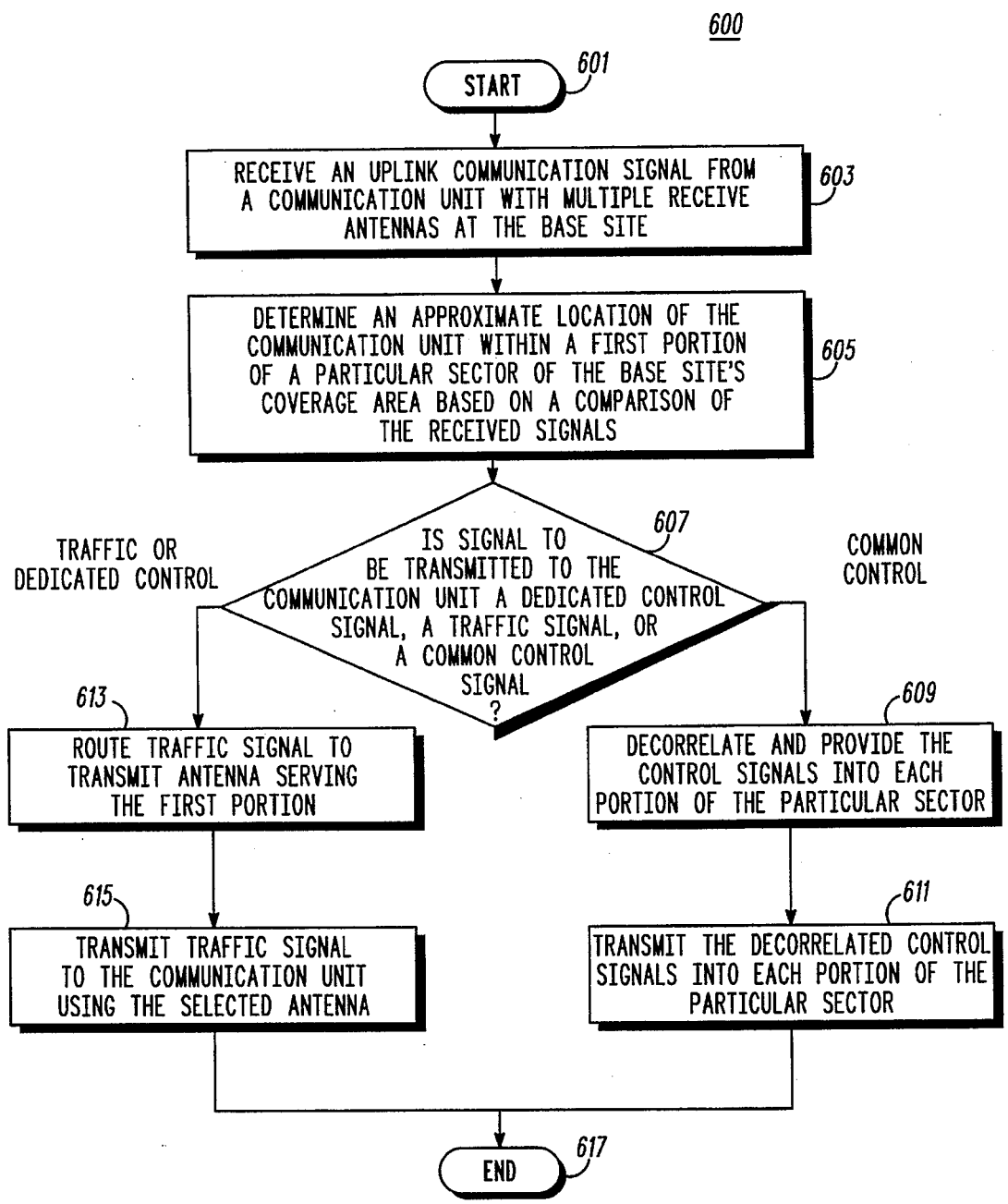

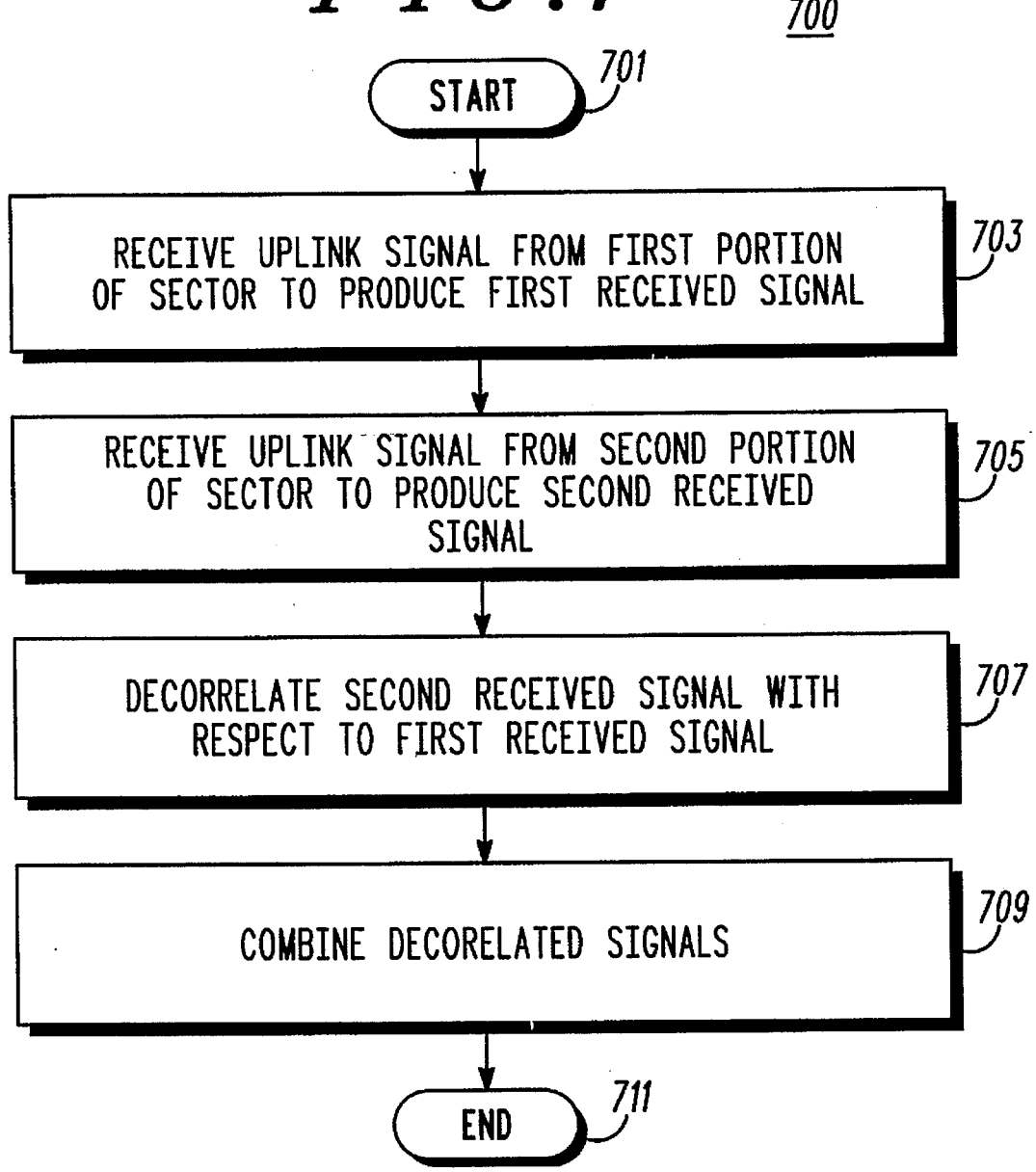

METHOD AND APPARATUS FOR CONVEYING A COMMUNICATION SIGNAL BETWEEN A COMMUNICATION UNIT AND A BASE SITE

FIELD OF THE INVENTION

The present invention relates generally to radio communication systems and, in particular, to a method and apparatus for conveying a communication signal between a base site and a communication unit in a radio communication system.

BACKGROUND OF THE INVENTION

Communication systems, such as cellular communication systems or trunked two-way communication systems, are known to comprise a plurality of communication units and a plurality of base sites. In a cellular communication system, each base site includes one or more base stations and provides communication services to a particular coverage area or cell. Each cell is typically partitioned into a plurality of sectors by using directional antennas at the base site serving the cell to increase the capacity of the cellular system. Each sector of a cell is served by one of the base stations at the base site and is allocated a particular set of channels to use for communications in that sector. Each channel might comprise a receive/transmit frequency pair in a frequency division multiple access (FDMA) communication system, a receive/transmit slot pair in a time division multiple access (TDMA) communication system, or a designated portion of an allocated system bandwidth in a spread spectrum communication system. The channels assigned to each set are determined by the desired channel reuse pattern for the cellular system.

To maximize capacity, without degrading signal quality due to an abundance of co-channel interference and noise, cellular systems typically employ channel reuse patterns of four and seven. In a four cell reuse pattern, all the allocatable channels (i.e., those used for two-way communications) are divided into four sets, one set for each cell. Similarly, in a seven cell reuse pattern, all the allocatable channels are divided into seven sets. However, to maintain a desired signal quality (e.g., a carrier-to-interference plus noise, C/I+N, of 17 dB), each cell in a four cell reuse pattern is typically divided into six 60 degree sectors; whereas, each cell in a seven cell reuse pattern it typically divided into three 120 degree sectors. Once a cell is sectorized, the particular set of channels assigned to that cell is similarly partitioned, such that each sector in the cell is assigned its own subset of the channels allocated to the cell. The channel partitioning within a cell is typically performed to minimize co-channel interference, adjacent channel interference, and noise in accordance with known techniques.

To provide adequate coverage at the cell boundary, each base site typically employs high power transmitters. The power of each transmitter is dependent upon the sectorization of a cell. For example, a higher power transmitter is necessary for a 120 degree sector than for a 60 degree sector in order to maintain a desired signal level along the sector boundary due to the higher directivity of of an antenna having a 60 degree half power beamwidth (HPBW) as compared with an antenna having a 120 degree HPBW.

As is known, cells in a cellular system are typically hexagonal in shape. Thus, each cell has six neighboring cells. The area near the border between any two cells is generally known as the fringe area, or handoff region, of a cell. Therefore, when a communication unit is communicating and enters the fringe area of its host cell, the base site for the host cell might hand off the communication to a base site serving one of the neighboring cells.

As is also known, cellular communication systems use signalling access formats, such as TDMA, FDMA, and code division multiple access (CDMA), to convey communication signals between communication units and their servicing base stations. In a CDMA system, all communication units in the system transmit uplink communication signals to their respective base station in a common reverse channel bandwidth. However, each uplink communication signal is associated with the serving base station by the inclusion of a pseudo-noise (PN) sequence (in direct sequence CDMA) or by a predetermined frequency hopping pattern (in slow or fast frequency hopping CDMA). The PN sequence and the frequency hopping pattern permit the base station to identify which uplink signals are intended for reception by the base station's receiver. In a similar manner, each base station transmits downlink communication signals to the communication units in its coverage area in a common forward channel bandwidth.

The discovery and technical advances associated with the advent of CDMA has permitted cellular system designers to begin using one cell and one sector channel reuse patterns. One cell channel repeat patterns have been attempted in FDMA and TDMA cellular systems; however, such attempts have required that the systems operate at degraded signal quality levels (e.g., at a C/I+N of 13 dB). By contrast, CDMA one cell and one sector repeat patterns generally can maintain acceptable signal quality levels.

In a one sector CDMA reuse configuration, each sector reuses the same channels as its neighboring sectors, as opposed to partitioning the allocatable channels as in other sectorization schemes. However, a problem arises in a CDMA system using a one sector channel reuse pattern when a communication unit is located in the handoff region between two or more sectors. When the communication unit is in the handoff region, it simultaneously receives downlink communication signals from two or more base station transmitters. Consequently, the communication unit is also receiving the noise, co-channel interference, and adjacent channel interference generated in the common forward channel bandwidth by the base stations since each base station is transmitting to its respective sector using a transmitter that provides adequate coverage at the sector boundary. Thus, the communication unit often cannot distinguish the downlink communication signals from the interference and noise. This indistinguishability results in poor signal quality, dropped calls, and limited capacity of the CDMA system due the forward channel degradation at the fringe areas of the cells.

A similar problem arises at the base station due to poor signal-to-noise performance in the common reverse channel bandwidth of a CDMA system when the communication unit is in the fringe area of a cell. The base station receives uplink communication signals from communication units in it's respective sector and from communication units in fringe areas of neighboring sectors. Thus, if the communication unit does not have enough transmit power to overcome the total noise received by the base station, the base station cannot distinguish the communication unit's uplink signal from the noise.

Therefore, a need exists for a method and apparatus for conveying a communication signal between a communication unit and a base site that services a sectorized coverage area. Such a method and apparatus that improves capacity in either the forward channel, the reverse channel, or both by reducing interference and noise in the respective channel would be an improvement over the prior art.

BRIEF DESCRIPTION OF THE DRAWINGS

FIG. 6 illustrates a logic flow diagram of steps executed by a base site to transmit a downlink communication signal in accordance with the present invention.

FIG. 7 illustrates a logic flow diagram of steps executed to receive an uplink communication signal at a base site in accordance with the present invention.

DESCRIPTION OF A PREFERRED EMBODIMENT

Generally, the present invention encompasses a method and apparatus for conveying a communication signal between a communication unit and a base site that services a sectorized coverage area in a communication system. The communication unit transmits an uplink communication signal to the base site. The base site receives the uplink communication signal and determines an approximate location of the communication unit within a first portion of a sector of the sectorized coverage area. A downlink communication signal is then transmitted to the communication unit based on the approximate location of the communication unit using an antenna structure that produces a beamwidth narrower than an angular width of the sector. By conveying the communication signal in this manner, the present invention effectively reduces the quantity of noise and interference received by a communication unit in the fringe area of a sector, thereby improving the signal quality of the communication signal received by the communication unit in the fringe area. Such a signal quality improvement results in an increase in the forward channel communication capacity of the sector.

Figure 1:
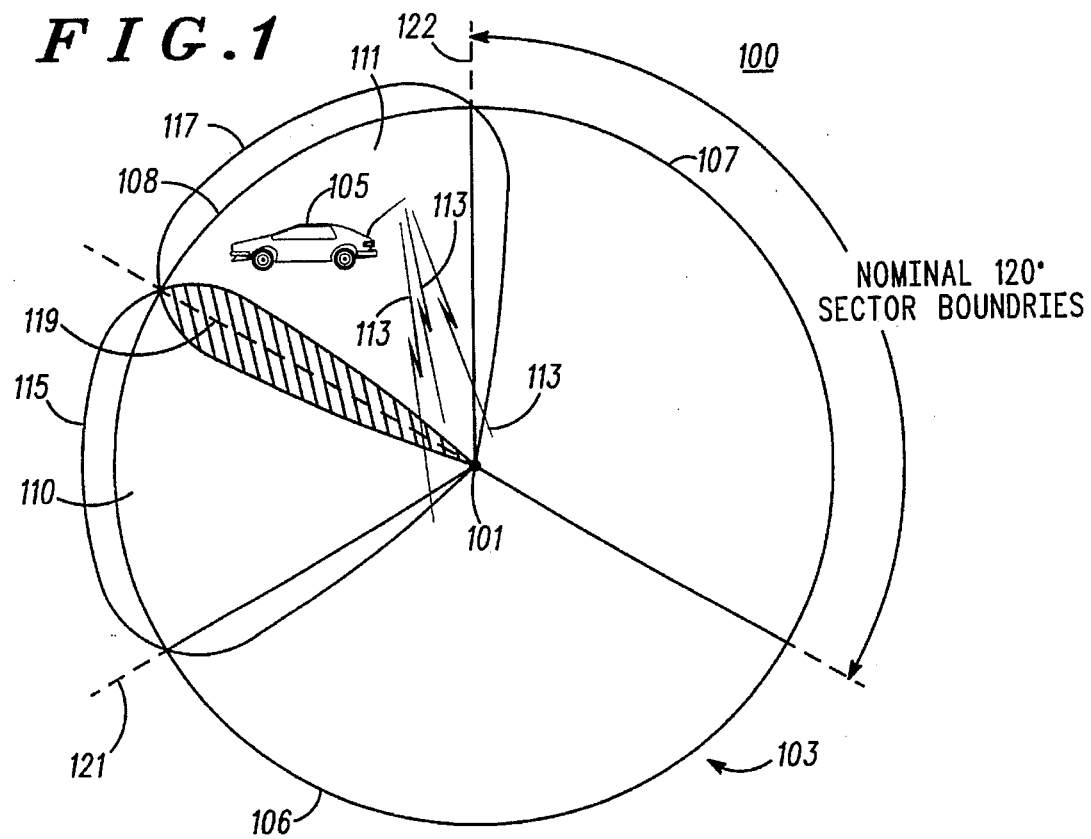
FIG. 1 illustrates a communication system that might employ the present invention.

The present invention can be more fully described with reference to FIGS. 1–7. FIG. 1 illustrates a communication system 100 that might employ the present invention. The communication system 100 comprises a communication unit 105 and a base site 101 that services a sectorized coverage area 103. The communication system 100 preferably comprises a spread spectrum communication system, such as the direct sequence CDMA (DS-CDMA) system set forth in Telecommunications Industry Association/Electronic Industries Association Interim Standard 95 (TIA/EIA/IS-95) or a frequency hopping system, such as those proposed for the domestic Personal Communications System (PCS). In an alternate embodiment, the communication system might comprise a TDMA communication system, such as those set forth in EIA/TIA/IS-54 and the Global System for Mobile (GSM) communications, or an FDMA system, such as that set forth in TIA/EIA/IS-91. The communication unit 105 preferably comprises a mobile or portable radiotelephone, although other types of two-way communicating devices might be alternatively used. The base site 101 is described in detail below with regard to FIG. 2.

As generally mentioned above, the coverage area 103 of the base site 101 is divided into a plurality of sectors 106–108 (three shown). In a preferred embodiment, each sector 106–108 occupies approximately 120 degrees of the coverage area 103; however, other sectorization schemes (e.g., six 60 degree sectors) might be alternatively employed. As shown in the FIG., sector 106 is adjacent to one side, or boundary 121, of sector 108 and sector 107 is adjacent to another boundary 122 of sector 108. In the depicted embodiment, sector 108 is further divided into a plurality of portions 110, 111 (two in this particular case). However, in a preferred embodiment, all sectors 106–108 of the coverage area 103 are apportioned similar to sector 108. The base site 101 serves each portion 110, 111 of sector 108 with a corresponding narrow beam antenna pattern 115, 117.

Conveyance of a communication signal between the base site 101 and the communication unit 105 in accordance with the present invention is generally performed in the following manner. It is assumed for the purpose of this discussion that the communication unit 105 is registered in the communication system 100 and is being serviced by the base site 101. When the communication unit 105 desires to communicate, the communication unit 105 transmits an uplink traffic communication signal 113 (e.g., a voice or data signal) to the base site 101. The base site 101 receives the uplink communication signal 113 from receive antennas that service each sector 106–108. Each sector 106–108 might be served by one or more receiving antennas depending on the system configuration (e.g., two antennas per sector 106–108 is a common configuration when using diversity reception).

Upon receiving the uplink communication signal 113, the base site 101 determines an approximate location of the communication unit 105 by preferably comparing the uplink signals 113 received from each sector 106, 107 of the coverage area 103 that is substantially adjacent to the sector 108 in which the communication unit 105 is currently resident. In a preferred embodiment, the comparison is performed on the signal strengths of the received uplink signals 113, although the comparison could be performed using other signal quality metrics, such as bit error rate, word error rate, or carrier-to-interference plus noise ratio.

When the signal strength of the uplink signal 113 received in sector 107 is greater than the signal strength of the uplink signal 113 received in sector 106, the base site 101 determines that the communication unit 105 is located in portion 111 of sector 108 and transmits a downlink communication signal (e.g., a traffic signal or a dedicated control signal) to the communication unit 105 using narrow beam antenna pattern 117. In a similar manner, when the signal strength of the uplink signal 113 received in sector 106 is greater than the signal strength of the uplink signal 113 received in sector 107, the base site 101 determines that the communication unit 105 is located in portion 110 and transmits the downlink communication signal to the communication unit 105 using narrow beam antenna pattern 115.

When the signal strength of the uplink signal 113 received in sector 106 is approximately equal to the signal strength of the uplink signal 113 received in sector 107, the base site 101 might determine that the communication unit 105 is in an overlap region 119 of the two narrow beam antenna patterns 115, 117 and, therefore, might transmit the downlink communication signal to the communication unit 105 using both narrow beam antenna patterns 115, 117. In the preferred embodiment, the downlink communication signal transmitted using narrow beam antenna pattern 115 is decorrelated, prior to transmission, with respect to the downlink communication signal transmitted using narrow beam antenna pattern 117 to provide sufficient coverage in the overlap region 119 (i.e., to minimize the probability for destructive interference of the downlink communication signal). Decorrelation of the downlink communication signals is preferably accomplished by delaying one downlink signal by a predetermined interval of time with respect to the other as detailed below.

In an alternate embodiment, the communication unit 105 might include a global positioning satellite (GPS) receiver to determine the communication unit's location within the coverage area 103. In such an embodiment, the communication unit 105 transmits its location to the base site 101 and the base site 101 subsequently transmits the downlink communication signal into the portion (e.g., 111) of the sector 108 in which the communication unit 105 is currently resident. The use of a GPS receiver in a communication unit for determining a location of the communication unit is described in detail in U.S. Pat. No. 5,235,633, entitled "Cellular Telephone System That Uses Position Of A Mobile To Make Call Management Decisions" and incorporated herein by reference. Thus, no further explanation will be provided except to facilitate an understanding of the present invention.

As illustrated in FIG. 1, each narrow beam antenna pattern 115, 117 in this particular embodiment occupies approximately one-half, or 60 degrees, of sector 108, although other sector partitioning schemes (e.g., a 100 degree portion and a 20 degree portion) might be alternatively employed. However, in contrast to prior art sectorization schemes, each portion 110, 111 of sector 108 can utilize all the channels allocated to sector 108 instead of requiring disjoint channel assignments in each portion 110, 111 as is the case with prior art sectorization.

The above discussion generally pertains to the conveyance of traffic communication signals (e.g., voice or data) and dedicated control signals—e.g., those used to inform the communication unit 105 of system conditions, such as handoff, particular to the communication unit 105—between the base site 101 and the communication unit 105. However, the transmission of common system control information from the base site 101 to the communication units in the base site's coverage area 103 should also be considered, particularly within the apportioned sector 108. To transmit common system control information to the communication units (e.g., 105) resident in sector 108, the base site 101 transmits a downlink common control signal using both narrow beam antenna patterns 115, 117. This transmission is accomplished in a manner similar to that described above for the transmission of a traffic signal into the overlap region 119 of portion 108. That is, the transmission of the downlink common control signal into portion 111 is preferably decorrelated with respect to the transmission of the downlink common control signal into portion 110 in order to provide sufficient coverage to those communication units located in the overlap region 119.

In a preferred embodiment, the transmit power used to transmit the directional downlink signals into the respective portions 110, 111 of sector 108 is less than that typically used to transmit downlink signals to the complete 120 degree sector 108 due to the directionality of the narrow beam antenna patterns 115, 117. Since less transmit power is required to service a communication unit 105 in a particular portion (e.g., 111) of the base site's coverage area 103, correspondingly less interference and noise is introduced into the fringe areas of the other portions 110 of the coverage area 103, especially when the communication system 100 is a DS-CDMA system. By introducing lower interference and noise levels into the various portions 110, 111 of the apportioned sector 108, the overall forward channel (base site 101 to communication unit 105) capacity of the sector 108 is increased as compared with the forward channel capacity of prior art sectorized coverage areas. Consequently, the present invention facilitates the utilization of a one sector channel reuse pattern, without reducing the capacity in each sector due to increased interference and noise in the handoff regions (fringe areas) between sectors, as in the prior art.

Figure 2:
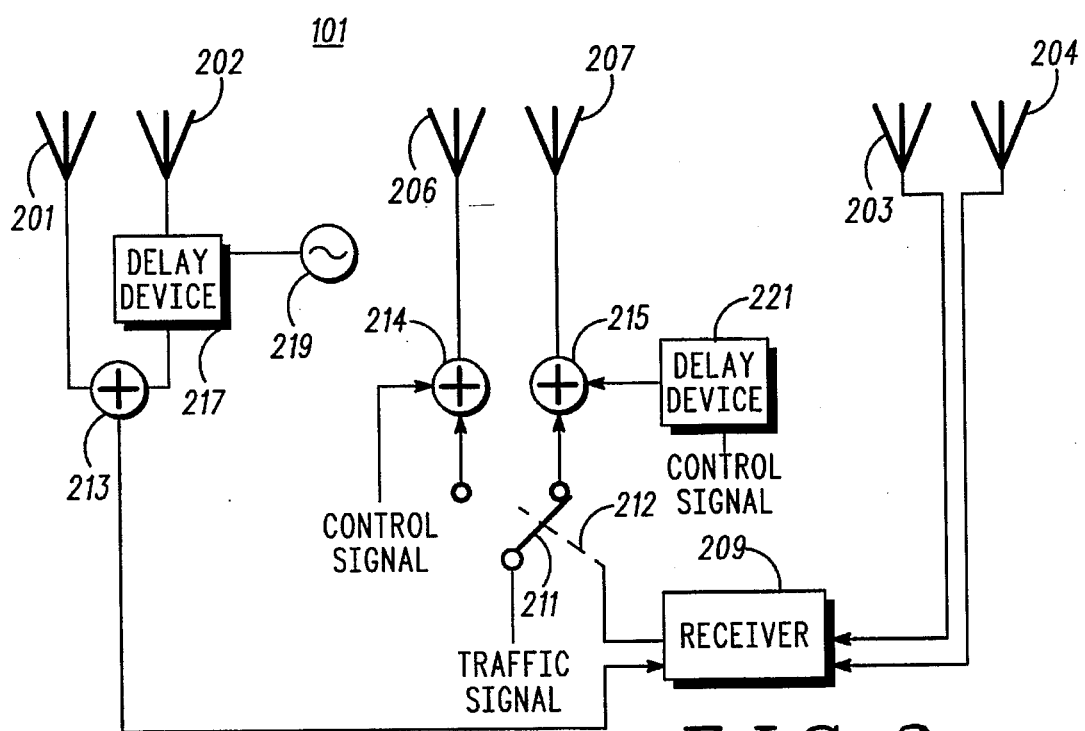
FIG. 2 illustrates a base site in accordance with the present invention.

FIG. 2 illustrates the base site 101 of FIG. 1 in accordance with the present invention. The base site 101 comprises, inter alia, a plurality of receive antennas 201–204, a plurality of transmit antennas 206, 207, and a receiver 209. In this particular embodiment, receive antenna 201 comprises a directional antenna having narrow beam antenna pattern 115 that receives uplink communication signals from portion 110 of sector 108. Receive antenna 202 comprises a directional antenna having narrow beam antenna pattern 117 that receives uplink communication signals from portion 111 of sector 108. Receive antennas 203, 204 comprise directional antennas that receive uplink communication signals from sectors 106 and 107, respectively. Each receive antenna 201–204 might comprise one or more directional antennas depending on whether diversity techniques are employed.

In an analogous manner, transmit antenna 206 comprises a directional antenna having narrow beam antenna pattern 115 that transmits downlink communication signals into portion 110 of sector 108, while transmit antenna 207 comprises a directional antenna having narrow beam antenna pattern 117 that transmits downlink communication signals into portion 111 of sector 108. However, as illustrated in FIG. 1, the transmit antennas 206, 207 together form a wide beam antenna pattern that substantially covers sector 108. In a preferred embodiment, the receiver 209 comprises the known electronic circuitry (e.g., filters, amplifiers, demodulators, and processing devices) necessary to receive DS-CDMA uplink signals and to measure and compare the signal strengths of those signals.

Reference to FIG. 1 will be made hereinbelow as necessary to facilitate an understanding of the invention. When the communication unit 105 transmits an uplink traffic signal 113 from portion 111 of sector 108, the uplink signal 113 is received by the receive antennas 201–204. Receive antennas 203 and 204 provide their received signals independently to the receiver 209; whereas, the uplink signals 113 received by receive antennas 201, 202 are first decorrelated and then combined in a combiner 213 prior to being provided to the receiver 209. The decorrelation is preferably accomplished using a delay device 217, such as a microwave delay line or a shift register delay line, that is inserted between one (e.g., 202) of the receive antennas 201, 202 serving the apportioned sector 108 and the combiner 213. The delay device 217 delays the uplink signal 113 received by the one receive antenna 202 by a predetermined interval of time with respect to the uplink signal 113 received by the other receive antenna 201 to decorrelate the two received signals. In a DS-CDMA system 100, the predetermined interval of time preferably comprises one PN chip (i.e., approximately 800 nanoseconds). The decorrelation allows the receiver 209 to independently demodulate each received uplink signal 113 in accordance with known techniques. However, since the uplink signals 113 received by receive antennas 201, 202 are combined prior to submission to the receiver 209 in this embodiment, the receiver 209 receives three uplink signals 113 from one communication unit transmission, wherein each received signal corresponds to a particular sector 106–108.

In a preferred embodiment, upon receiving the three uplink signals, the receiver 209 determines the approximate location (i.e., the portion 111 of the apportioned sector 108) of the communication unit 105 by comparing the uplink signals 113 received by receive antennas 203 and 204. As discussed above, when the signal strength of the uplink signal 113 received by receive antenna 204 is larger than the signal strength of the uplink signal 113 received by receive antenna 203, the receiver 209 determines that the communication unit 105 is located in portion 111 of sector 108. Similarly, when the signal strength of the uplink signal 113 received by receive antenna 203 is larger than the signal strength of the uplink signal 113 received by receive antenna 204, the receiver 209 determines that the communication unit 105 is located in portion 110 of sector 108. Thus, in a preferred embodiment, the receiver 209, or at least a portion thereof, effectively becomes a means for identifying the portion (e.g., 111) of the sector 108 to route the downlink traffic, or dedicated control, signal into based on the signal strength comparison. Once the appropriate portion 111 is identified, the receiver 209 directs a switch 211 (e.g., a known transmission gate circuit), via a control line 212, to provide the downlink signal to the corresponding narrow beam transmit antenna (e.g., 207) that serves the identified portion 111.

The selected transmit antenna 207 then conveys the downlink signal into the appropriate portion 111 of the sector 108. In this manner, the switch 211, the control line 212, and the transmit antennas 206, 207 collectively comprise selection means for routing the downlink signal into the appropriate portion 110 or portions 110, 111 of the sector 108 in which the communication unit 105 is currently resident.

In an alternate embodiment, the receiver 209 might determine the approximate location of the communication unit 105 and, accordingly, which portion of the partitioned sector 108 to transmit into based on signal strength measurements made by the communication unit 105 of downlink communication signals transmitted by the base site 101. In this case, the communication unit 105 measures the downlink signal received from the base site 101 and transmits the measured signal strength information back to the base site 101. Based on the communication unit's measurements, the base site 101 then determines whether the downlink signal is being transmitted into the proper portion 111 of the apportioned sector 108. This determination might be accomplished by comparing the communication unit's measured signal strength to a predetermined threshold.

In yet another embodiment, the receiver 209 might determine the approximate location of the communication unit 105 based on signal strength measurements made at another base site (not shown) of the communication system 100. In this embodiment, the other base site measures the signal strength of the uplink signals 113 transmitted by the communication unit 105. The other base site then conveys those measurements to a central location (e.g., base site 101) where the communication unit's location is estimated using known triangulation techniques.

In a further embodiment, the receiver 209 might determine the approximate location of the communication unit 105 based on signal strength measurements made by the communication unit 105 of downlink communication signals transmitted by other base sites (not shown) in the communication system 100. The communication unit 105 then conveys these measurements to a central location (e.g., base site 101) where the communication unit's location is estimated using known triangulation techniques.

To transmit common system control signals from the base site 101 into the apportioned sector 108, as discussed above, the base site 101 preferably decorrelates the common control signal provided to one transmit antenna 207 with respect to the common control signal provided to the other transmit antenna 206. In a preferred embodiment, this decorrelation is performed by delaying the common control signal provided to transmit antenna 207 by a predetermined interval of time—e.g., one PN chip for a DS-CDMA control signal—using a delay device 221, such as shift register delay line. In the preferred embodiment, the downlink common control signal is summed with the downlink traffic signal in a respective summer 214, 215 prior to being provided to the appropriate transmit antenna 206, 207. Such an approach allows the downlink common control signals to be routed to the complete sector 108, while the downlink traffic signal is directed only to the selected portion (e.g., 111).

As discussed above, receive antennas 201, 202 receive the uplink communication signal 113 from sector 108. However, since the received signals are combined prior to being provided to the receiver 209, they may not be usable in determining the communication unit's approximate location. In an alternate embodiment, the base site 101 further includes a modulator for controlling the delay device 217 that performs the decorrelation. The modulator 219 is used to modulate the delay—e.g., using a periodic modulation pattern—introduced by the delay device 217, thereby providing an identifiable signature for the receiver 209 to recognize. Upon recognizing the modulation pattern, the receiver 209 can determine that the uplink signal was received from that portion (e.g., 111) of the sector 108 served by the receive antenna 202 whose received signals encounter a modulated delay prior to being provided to the receiver 209. In an analogous manner, when the receiver 209 receives an uplink signal from combiner 213 that is not modulated, the receiver 209 can determine that the uplink signal was received from that portion (e.g., 110) of the sector 108 served by the receive antenna 201 whose received signals do not encounter the modulated delay.

In yet another embodiment, the uplink signals received by receive antennas 201, 202 might be independently provided to the receiver 209 to allow the receiver 209 to easily determine which portion 110, 111 of the sector 108 the communication unit 105 resides in. However, this embodiment increases the complexity of the receiver 209.

Figure 3:
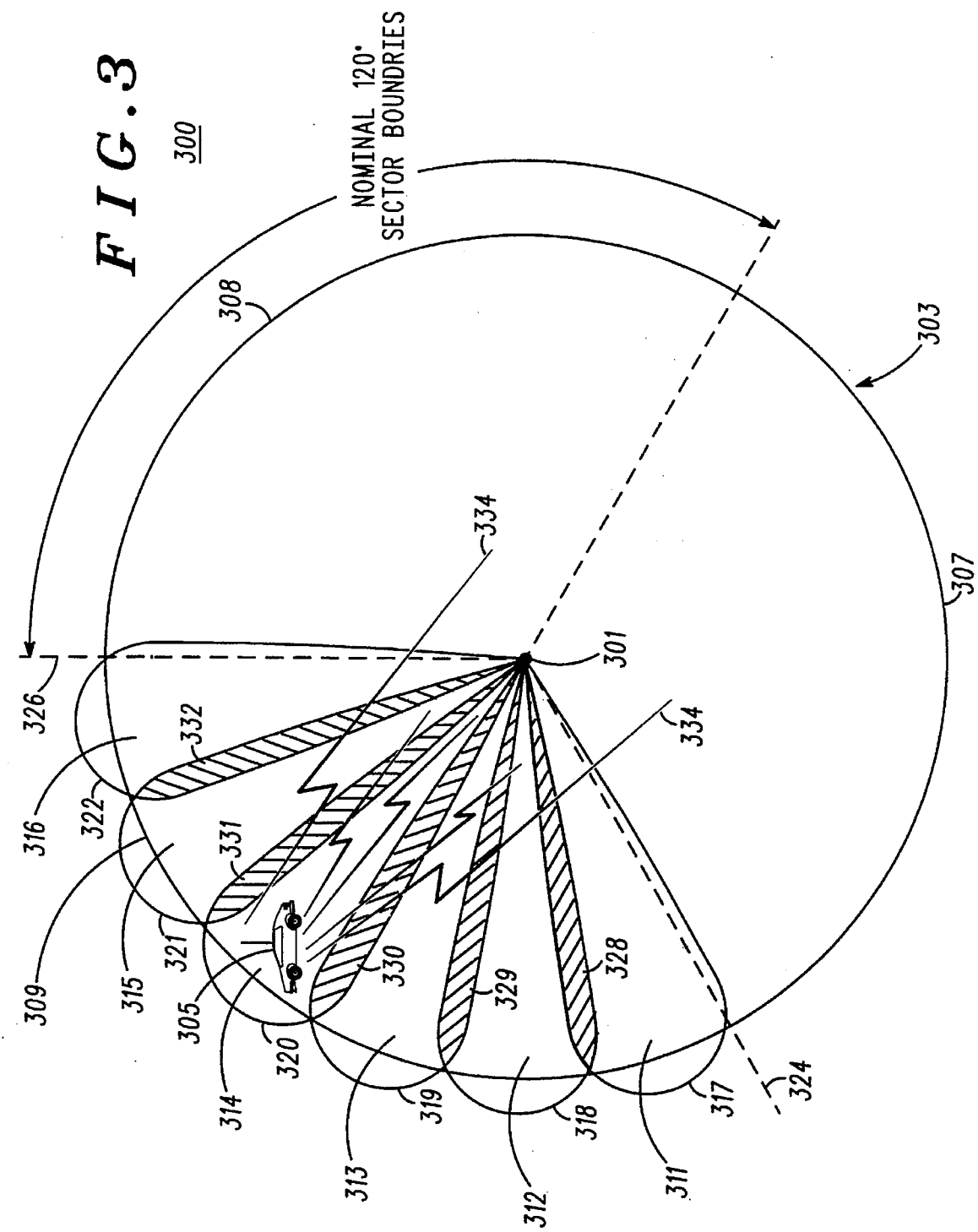
FIG. 3 illustrates an alternate communication system that might employ the present invention.

FIG. 3 illustrates an alternate communication system 300 that might employ the present invention. The communication system 300 comprises a communication unit 305 and a base site 301 that services a sectorized coverage area 303. The communication system 300 might comprise any one of those systems set forth above with regard to FIG. 1. The communication unit 305 preferably comprises a mobile or portable radiotelephone, although other types of two-way communicating devices might be alternatively used. The base site 301 is described in detail below with regard to FIG. 4.

The coverage area 303 of the base site 301 is divided into a plurality of sectors 307–309 (three shown) similar to the coverage area 103 depicted in FIG. 1. As shown in the FIG., sector 307 is adjacent to one side, or boundary 324, of sector 309 and sector 308 is adjacent to another boundary 326 of sector 309. Sector 309 is further divided into a plurality of portions 311–316 (six in this particular case). In a preferred embodiment, the base site 301 transmits to each portion 311–316 of sector 309 with a corresponding narrow beam antenna pattern 317–322.

Conveyance of a traffic, or dedicated control, signal between the base site 301 and the communication unit 305 in accordance with this embodiment of the present invention is generally performed in the following manner. When the communication unit desires to communicate, the communication unit 305 transmits an uplink communication signal 334 to the base site 301. The base site 301 receives the uplink signal 334 from receive antennas that service the sectors 307, 308 adjacent to the apportioned sector 309 and from receive antennas that service the apportioned sector 309. For example, in this particular embodiment, three receive antennas service the apportioned sector 309, each antenna serving a pair (e.g., 311, 312) of the portions 311–316, as detailed below with regard to FIG. 4.

Upon receiving the uplink signal 334, the base site 301 determines an approximate location of the communication unit 305 by preferably comparing the signal strengths of the signals received by the receive antennas serving the apportioned sector 309 and the sectors 307, 308 adjacent to the apportioned sector 309. The receive antenna providing the highest signal strength corresponds to the sector 307, 308 or pair of portions 313–314 in which the communication unit 305 might be located. As illustrated in FIG. 3, the communication unit 305 is currently resident in portion 314 of the pair of portions 313–314. To identify which portion 314 of the pair 313–14 the communication unit 305 is in, the base site 301 then compares the received signal strengths for the uplink signals 334 received by the receive antennas serving the pairs of portions 311–312, 315–316 that are adjacent to the pair of portions 313–314 in which the communication unit 305 is located.

When the signal strength of the uplink signal 334 received by the receive antenna serving portions 311–312 is greater than the signal strength of the uplink signal 334 received by the receive antenna serving portions 315–316, the base site 301 determines that the communication unit 305 is located in portion 313 of the identified pair of portions 313–314 and transmits a downlink communication signal to the communication unit 305 using narrow beam antenna pattern 319. In a similar manner, when the signal strength of the uplink signal 334 received by the receive antenna serving portions 315–316 is greater than the signal strength of the uplink signal 334 received by the receive antenna serving portions 311–312 (as is the case shown in FIG. 3), the base site 301 determines that the communication unit 105 is located in portion 314 of the identified pair of portions 313–314 and transmits the downlink communication signal to the communication unit 305 using narrow beam antenna pattern 320.

When the signal strength of the uplink signal 334 received by the receive antenna serving portions 311–312 is approximately equal to the signal strength of the uplink signal 334 received by the receive antenna serving portions 315–316, the base site 301 might determine that the communication unit 305 is in an overlap region 330 of the two narrow beam antenna patterns 319, 320 and, therefore, might transmit the downlink communication signal to the communication unit 305 using both narrow beam antenna patterns 319, 320. In a preferred embodiment, the downlink communication signal transmitted using narrow beam antenna pattern 320 is decorrelated, prior to transmission, with respect to the downlink communication signal transmitted using narrow beam antenna pattern 319 to provide sufficient coverage in the overlap region 330. Decorrelation of the downlink communication signals is preferably accomplished by delaying one downlink signal by a predetermined interval of time with respect to the other as detailed below.

In the above discussion, the communication unit 305 was centrally located in the apportioned sector 309 and the communication unit's approximate location was determined by comparing signal strengths of uplink signals 334 received by receiving antennas serving the apportioned sector 309. However, if in an alternate embodiment, the communication unit 305 is located, for example, in portion 316, the base site would then compare the signal strength of the uplink signal 334 received in sector 308 with the signal strength of the uplink signal 334 received by the receiving antenna serving portions 313–314 of the apportioned sector 309 to determine whether the communication unit is located in portion 315, portion 316, or in overlap region 332.

The transmission of common system control information from the base site 301 to the communication units in the base site's coverage area 303 is accomplished in a manner analogous to that described above with regard to FIG. 1, particularly within the apportioned sector 309. To transmit system control information to the communication units (e.g., 305) resident in sector 309, the base site 301 transmits a downlink control signal using all the narrow beam antenna patterns 317–322. This transmission is accomplished in a manner similar to that described above for the transmission of a traffic signal into the overlap region 330 of portions 313, 314. That is, the transmission of the downlink control signal into each portion 311–316 is preferably decorrelated with respect to the transmission of the downlink control signal into an adjacent portion 311–316 in order to provide sufficient coverage to those communication units located in the overlap regions 328–332.

Figure 4:
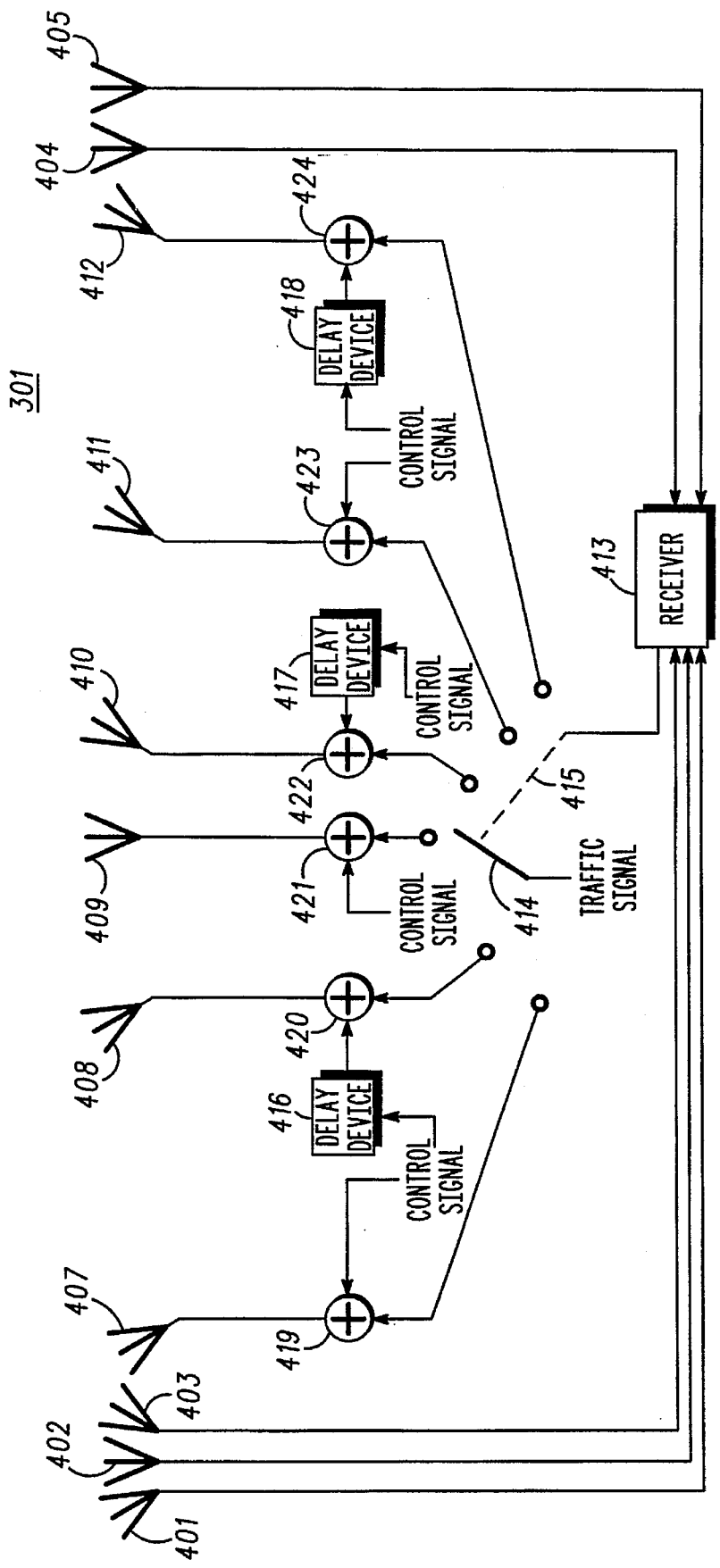
FIG. 4 illustrates an alternate base site in accordance with the present invention.

FIG. 4 illustrates the base site 301 of FIG. 3 in accordance with the present invention. The base site 301 comprises, inter alia, a plurality of receive antennas 401–405, a plurality of transmit antennas 407–412, and a receiver 413. The receiver 413 is preferably comparable to the receiver 209 of FIG. 2. In this particular embodiment, receive antenna 401 comprises a directional antenna having a narrow beam antenna pattern that receives uplink communication signals from portions 311–312 of sector 309. Receive antenna 402 comprises a directional antenna having a narrow beam antenna pattern that receives uplink communication signals from portions 313–314 of sector 309. Receive antenna 403 comprises a directional antenna having a narrow beam antenna pattern that receives uplink communication signals from portions 315–316 of sector 309. Receive antennas 404, 405 comprise directional antennas that receive uplink communication signals from sectors 307 and 308, respectively. Each receive antenna 401–405 might comprise one or more directional antennas depending on whether diversity techniques are employed.

In an analogous manner, transmit antenna 407 comprises a directional antenna having narrow beam antenna pattern 317 that transmits downlink communication signals into portion 311 of sector 309, while transmit antenna 408 comprises a directional antenna having narrow beam antenna pattern 318 that transmits downlink communication signals into portion 312 of sector 309. Transmit antenna 409 comprises a directional antenna having narrow beam antenna pattern 319 that transmits downlink communication signals into portion 313 of sector 309, while transmit antenna 410 comprises a directional antenna having narrow beam antenna pattern 320 that transmits downlink communication signals into portion 314 of sector 309. Transmit antenna 411 comprises a directional antenna having narrow beam antenna pattern 321 that transmits downlink communication signals into portion 315 of sector 309, while transmit antenna 412 comprises a directional antenna having narrow beam antenna pattern 322 that transmits downlink communication signals into portion 316 of sector 309. As illustrated in FIG. 3, the transmit antennas 407–412 together form a wide beam antenna pattern that substantially covers the apportioned sector 309.

Reference to FIG. 3 will be made hereinbelow as necessary to facilitate an understanding of the invention. When the communication unit 305 transmits an uplink traffic signal 334 from portion 314 of sector 309, the uplink signal 334 is received by the receive antennas 401–405. Each received signal is then individually provided to the receiver 413. The receiver 413 compares the signal strengths of the received signals to determine an approximate location of the communication unit 305 and to identify the appropriate portion 314 of the apportioned sector 309 to transmit into, as discussed above with regard to FIG. 3. Once the appropriate portion 314 is identified, the receiver 409 directs a switch 414, via a control line 415, to provide a downlink traffic signal or dedicated control signal to the transmit antenna 410 that serves the identified portion 314. The selected antenna 410 then conveys the downlink signal to the communication unit 305 in the identified portion 314.

To transmit common system control signals from the base site 301 into the apportioned sector 309, the base site 301 preferably decorrelates the common control signal provided to transmit antennas 408, 410, 412 with respect to the common control signal provided to transmit antennas 407, 409, 411. In a preferred embodiment, this decorrelation is performed by delaying the common control signals provided to transmit antennas 408, 410, 412 by a predetermined interval of time—e.g., one PN chip for a DS-CDMA control signal—using delay devices 416–418. In an alternate embodiment, additional delay devices (not shown) might be incorporated to introduce a unique delay for each common control signal. Each delay device 416–418 might comprise a microwave delay line or shift register delay line, as discussed above with regard to FIG. 2. The decorrelation of the common control signals provided to alternating antennas 408, 410, 412 insures sufficient coverage of the apportioned sector 309, especially in the overlap regions 328–332, by minimizing the probability for destructive interference of the common control signals in any portion 311–316 of the sector 309.

In a preferred embodiment, the downlink common control signal is summed with the downlink traffic signal in a respective summer 419–424 prior to being provided to the appropriate transmit antenna 407–412. Such an approach allows the downlink common control signals to be routed to the complete sector 309, while the downlink traffic signal is routed only to the selected portion (e.g., 314).

Figure 5:
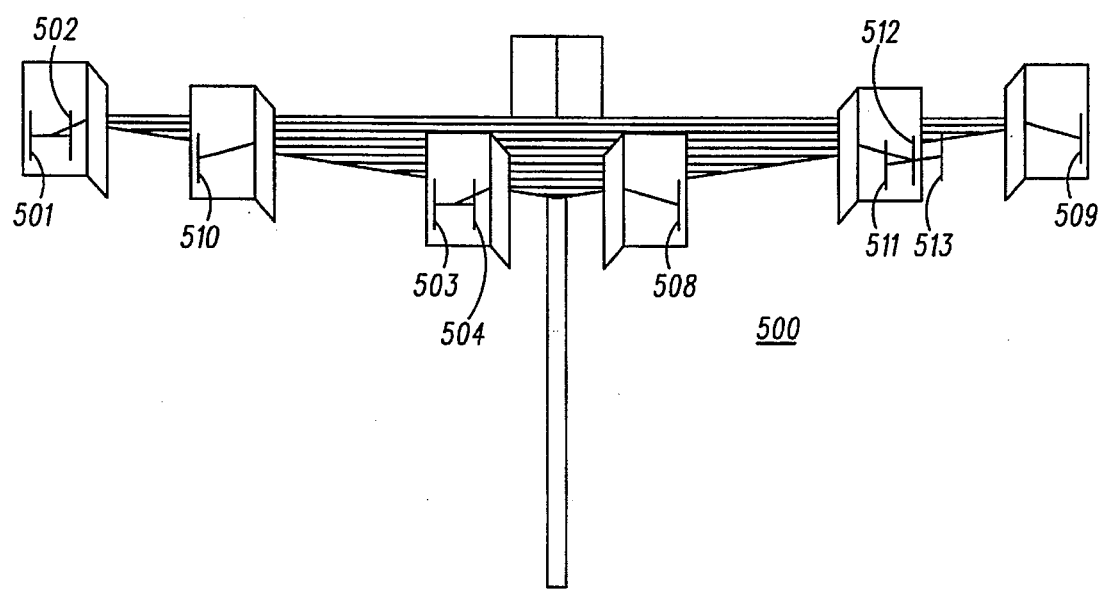
FIG. 5 illustrates a base site antenna tower that supports a receive antenna structure and a transmit antenna structure for each sector of a base site's sectorized coverage area in accordance with the present invention.

FIG. 5 illustrates a base site antenna tower 500 that supports a receive antenna structure and a transmit antenna structure for each sector of a base site's sectorized coverage area in accordance with the present invention. Each receive antenna structure preferably comprises a plurality of directional receive antennas (e.g., 501–504 and 508, 509) that receive uplink communication signals from a particular sector of the base site's coverage area. As depicted in FIG. 5, receive antennas 501, 503 provide diversity reception to one portion of a first sector of the coverage area, while receive antennas 502, 504 provide diversity reception to another portion of the first sector. Similarly, receive antennas 508, 509 provide diversity reception to a second sector of the coverage area.

Each transmit antenna structure might comprise one or more transmit antennas 510–513, as shown. In a preferred embodiment, the transmit antenna structure comprises a plurality of directional transmit antennas 511–513 (as discussed above with regard to FIGS. 1–4) that are used to transmit downlink communication signals to respective portions of a first sector of the coverage area. Thus, in the preferred embodiment, each transmit antenna 511–513 has an antenna pattern with a beamwidth (e.g., 40 degrees) narrower than an angular width (e.g., 120 degrees) of the first sector. In an alternate embodiment, the transmit antenna structure might comprise a single antenna 510 that independently transmits to each portion of a second sector. In this embodiment, the single antenna 510 preferably comprises a well-known steerable beam antenna.

FIG. 6 illustrates a logic flow diagram 600 of steps executed by a base site in accordance with the present invention. The logic flow begins (601) when the base site receives (603) an uplink communication signal from a communication unit with multiple receive antennas at the base site. In a preferred embodiment, the multiple receive antennas comprise the one or more receive antennas (depending on whether diversity is used) that receive signals from each sector of the base site's sectorized coverage area. In an alternate embodiment, the multiple receive antennas might comprise the one or more receive antennas that receive signals from each portion of an apportioned sector of the base site's coverage area.

Upon receiving the uplink signal with each receive antenna, the base site determines (605) an approximate location of the communication unit within a first portion of a particular sector of the base site's coverage area based on a comparison of the uplink signals received by the multiple receive antennas. The base site preferably measures the signal strengths of the received signals and determines the particular sector that the communication unit is in based on which receive antenna, or collection of receive antennas (e.g., those serving an apportioned sector), provides the uplink signal having the highest signal strength.

Once the particular sector is identified, the base site compares the signal strengths of the signals received from the sectors adjacent to the particular sector, as discussed above with regard to FIGS. 1 and 2, to determine which portion of the particular sector the communication unit is currently located in. In an alternate embodiment, as discussed above with regard to FIGS. 3 and 4, the base site might compare the signal strengths of the signals received from portions of the particular sector that are adjacent to the portions in which the communication unit might be located.

Upon determining the approximate location of the communication unit, the base site determines (607) whether the downlink signal to be transmitted to the communication unit is a dedicated control signal, a traffic signal, or a common system control signal. When the downlink signal is a common system control signal, the base site decorrelates (609) the control signal provided to each transmit antenna serving a respective portion of the particular sector. The base site then transmits (611) the control signal into the particular sector using the transmit antennas and the logic flow ends (617).

When the signal to be transmitted is a traffic signal or a dedicated control signal, the base site routes (613) the downlink signal to the transmit antenna serving the appropriate portion of the particular sector (i.e., the portion in which the communication unit is resident). The base site transmits (615) the downlink signal to the communication unit using the selected antenna and the logic flow ends (617).

FIG. 7 illustrates a logic flow diagram 700 of steps executed to receive an uplink communication signal at a base site in accordance with the present invention. The logic flow begins (701) when the base site receives (703) an uplink communication signal from a first portion of a sector to produce a first received signal and receives (705) an uplink communication signal from a second portion of a sector to produce a second received signal. In a preferred embodiment, each uplink signal is received via a narrow beam directional antenna serving the respective portion of the sector.

Upon receiving the uplink signals, the base site decorrelates (707) the second received signal with respect to the first received signal. This decorrelation is preferably accomplished by delaying the second received signal by a predetermined time interval with respect to the first received signal, as discussed above with regard to FIG. 2. The decorrelated signals are then combined (709) and provided to a receiver at the base site, and the logic flow ends (711). Since the received signals are decorrelated prior to submission to the receiver, the receiver can distinguish each received signal by the imposed time delay. Such a technique of distinguishing decorrelated signals is often denoted "raking." Thus, by examining the decorrelated signals, the base site can determine which portion of the sector the communication unit is located in and, if so desired, transmit a responsive downlink signal into the identified portion, as described above. This approach effectively improves the reverse channel capacity of the sector by limiting the power received from any particular portion. By limiting the reverse channel power, uplink interference is proportionally reduced in each portion of the apportioned sector. The amount of reverse channel capacity improvement is proportional to the number of transmit antennas employed at the base site to cover the apportioned sector.

The present invention encompasses a method and apparatus for conveying a communication signal between a communication unit and a base site that services a sectorized coverage area in a communication system. With this invention, a downlink signal can be directionally transmitted from the base site to the communication unit upon determining the communication unit's approximate location, thereby reducing the amount of forward channel interference and noise perceived by the communication unit during the transmission and effectively increasing the forward channel capacity of the base site's coverage area as compared to the prior art. Conversely, an uplink communication signal can be directionally received from the communication unit by the base site, thereby reducing the amount of reverse channel interference and noise perceived by the base site during the transmission and effectively increasing the reverse channel capacity of the base site's coverage area. Further, the present invention facilitates the use of lower power amplifiers at the base site since less power is needed to obtain coverage at the fringe of a sector when using narrow beam transmit antennas.

What is claimed is:

1. A method for transmitting a downlink communication signal from a base site that services a sectorized coverage area to a communication unit residing in the sectorized coverage area, the method comprising the steps of:

a) determining an approximate location of the communication unit within a first sector of the sectorized coverage area; and b) transmitting the downlink communication signal to the approximate location of the communication unit using an antenna structure that produces a beamwidth narrower than an angular width of the first sector.

2. The method of claim 1, wherein the antenna structure comprises a plurality of transmit antennas, each of the plurality of transmit antennas being characterized by a narrow beam antenna pattern, and wherein the step of transmitting comprises the step of transmitting the downlink communication signal from a first transmit antenna of the plurality of transmit antennas.

3. The method of claim 2, wherein the downlink communication signal comprises a traffic signal or a dedicated control signal.

4. The method of claim 2, wherein the step of transmitting further comprises the step of transmitting the downlink communication signal from at least a second transmit antenna of the plurality of transmit antennas.

5. The method of claim 4, wherein the downlink communication signal comprises a common system control signal.

6. The method of claim 4, wherein the step of transmitting the downlink communication signal from at least a second transmit antenna further comprises the step of, prior to transmitting, decorrelating the downlink communication signal to be transmitted by the first transmit antenna with respect to the downlink communication signal to be transmitted by the second transmit antenna.

7. The method of claim 6, wherein the step of decorrelating comprises the step of delaying the downlink communication signal to be transmitted by the first transmit antenna by a predetermined interval of time with respect to the downlink communication signal to be transmitted by the second transmit antenna.

8. The method of claim 7, wherein the predetermined interval of time comprises at least one pseudo-noise chip.

9. The method of claim 1, wherein the step of determining comprises the steps of:

a1) transmitting, by the communication unit, an uplink communication signal;

a2) receiving, by the base site, the uplink communication signal from a second sector of the sectorized coverage area, the second sector being substantially adjacent to a first side of the first sector;

a3) receiving, by the base site, the uplink communication signal from a third sector of the sectorized coverage area, the third sector being substantially adjacent to a second side of the first sector; and a4) comparing, at the base site, the uplink communication signal received from the second sector with the uplink communication signal received from the third sector to determine the approximate location of the communication unit.

10. The method of claim 1, wherein the step of determining comprises the steps of:

a1) transmitting, by the communication unit, an uplink communication signal;

a2) receiving, by the base site, the uplink communication signal from a first portion of the first sector;

a3) receiving, by the base site, the uplink communication signal from a second portion of the first sector; and a4) comparing, at the base site, the uplink communication signal received from the first portion with the uplink communication signal received from the second portion to determine the approximate location of the communication unit.

11. The method of claim 1, wherein the step of determining comprises the steps of:
   a1) transmitting, by the communication unit, an uplink communication signal;
   a2) receiving, by the base site, the uplink communication signal from a first portion of the first sector;
   a3) receiving, by the base site, the uplink communication signal from a second portion of the first sector;
   a4) decorrelating the uplink communication signal received from the second portion with respect to the uplink communication signal received from the first portion to produce decorrelated signals;
   a5) combining the decorrelated signals to produce combined decorrelated signals; and
   a6) comparing the combined decorrelated signals to determine the approximate location of the communication unit.

12. A method for receiving an uplink communication signal at a base site from a communication unit residing in a sectorized coverage area of the base site, the method comprising the steps of:
   a) receiving the uplink communication signal at a first antenna to produce a first received signal;
   b) receiving the uplink communication signal at a second antenna to produce a second received signal;
   c) decorrelating the second received signal with respect to the first received signal to produce decorrelated uplink signals; and
   d) combining the decorrelated uplink signals.

13. The method of claim 12, wherein each step of receiving comprises the step of receiving the uplink communication signal from a corresponding one of a plurality of receive antennas, each of the plurality of receive antennas being characterized by a narrow beam antenna pattern.

14. A base site that services a sectorized coverage area, comprising:
   a receiver for receiving an uplink communication signal from a first sector of the sectorized coverage area; and
   selection means, operably coupled to the receiver, for routing a downlink communication signal to a first portion of a plurality of portions of the first sector, each of the portions defined by a beamwidth narrower than the first sector, based on an approximate location of a communication unit that transitted the uplink communication signal.

15. The base site of claim 14, wherein the selection means further comprises a transmit antenna structure for transmitting to at least one of the plurality of portions.

16. The base site of claim 15, wherein the transmit antenna structure comprises a plurality of transmit antennas, each of the plurality of transmit antennas being characterized by a narrow beam antenna pattern for transmitting to a corresponding one of the plurality of portions.

17. The base site of claim 16, wherein the plurality of transmit antennas are arranged to form a wide beam antenna pattern that substantially covers the first sector.

18. The base site of claim 16, wherein the selection means comprises means for providing the downlink communication signal to a first transmit antenna of the plurality of transmit antennas and to a second transmit antenna of the plurality of transmit antennas.

19. The base site of claim 18, wherein the downlink communication signal comprises a common system control signal.

20. The base site of claim 18, further comprising means, operably coupled to the selection means, for decorrelating the downlink communication signal provided to the second transmit antenna with respect to the downlink communication signal provided to the first transmit antenna.

21. The base site of claim 20, wherein the means for decorrelating comprises a delay device for delaying the downlink communication signal provided to the second transmit antenna by a predetermined time interval.

22. The base site of claim 21, wherein the predetermined time interval comprises at least one pseudo-noise chip.

23. The base site of claim 15, wherein the transmit antenna structure comprises a single antenna that independently transmits to each of the plurality of portions.

24. The base site of claim 23, wherein the single antenna comprises a steerable beam antenna.

25. The base site of claim 14, wherein the downlink communication signal comprises a traffic signal or a dedicated control signal.

26. The base site of claim 14, further comprising means, operably coupled to the selection means, for identifying a portion of the plurality of portions to route the downlink communication signal into based on a comparison of an uplink communication signal received from a second sector of the sectorized coverage area and an uplink communication signal received from a third sector of the sectorized coverage area, wherein the second sector is adjacent to a first side of the first sector and wherein the third sector is adjacent to a second side of the first sector.

27. The base site of claim 14, further comprising means, operably coupled to the selection means, for identifying a portion of the plurality of portions to route the downlink communication signal into based on a comparison of signals received from at least two portions of the plurality of portions.

28. The base site of claim 14, further comprising means, operably coupled to the selection means, for identifying a portion of the plurality of portions to route the downlink communication signal into based on received signal strength measurements obtained by a communication unit residing in the first sector or another base site.

29. A base site that services a sectorized coverage area, comprising:
   a first receive antenna for receiving an uplink communication signal from a first portion of a first sector of the sectorized coverage area;
   a second receive antenna for receiving the uplink communication signal from a second portion of the first sector;
   decorrelating means, operably coupled to the first receive antenna and the second receive antenna, for decorrelating the uplink communication signal received by the second receive antenna with respect to the uplink communication signal received by the first receive antenna to produce decorrelated uplink signals; and
   combining means, operably coupled to the decorrelating means, for combining the decorrelated uplink signals.

30. The base site of claim 29, wherein the decorrelating means comprises a delay device for delaying the uplink communication signal received by the second receive antenna by a predetermined time interval with respect to the uplink communication signal received by the first receive antenna.

31. The base site of claim 30, wherein the predetermined time interval comprises at least one pseudo-noise chip.

32. The base site of claim 30, wherein the delay device delays the uplink communication signal received by the second receive antenna based on a predetermined modulation pattern.

* * * * *